(12) United States Patent
Saric

(10) Patent No.: US 7,974,463 B2
(45) Date of Patent: Jul. 5, 2011

(54) COMPENSATING FOR DISTORTION IN DIGITAL IMAGES

(75) Inventor: Marin Saric, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/691,406

(22) Filed: Jan. 21, 2010

(65) Prior Publication Data

US 2010/0177169 A1 Jul. 15, 2010

Related U.S. Application Data

(63) Continuation of application No. 11/011,727, filed on Dec. 14, 2004, now Pat. No. 7,660,458.

(51) Int. Cl.
*G06K 9/00* (2006.01)

(52) U.S. Cl. ........................................................ 382/154

(58) Field of Classification Search .................. 382/154, 382/173, 180, 190, 223
See application file for complete search history.

(56) References Cited

U.S. PATENT DOCUMENTS

| | | | |
|---|---|---|---|
| 5,867,591 A | 2/1999 | Onda | |
| 5,987,163 A | 11/1999 | Matsuda | |
| 6,167,151 A | 12/2000 | Albeck et al. | |
| 6,249,600 B1 | 6/2001 | Reed et al. | |
| 6,493,469 B1 * | 12/2002 | Taylor et al. | 382/284 |
| 6,608,923 B1 | 8/2003 | Zhang et al. | |
| 6,724,922 B1 * | 4/2004 | Vilsmeier | 382/128 |
| 7,418,126 B2 * | 8/2008 | Fujimoto et al. | 382/154 |
| 2002/0012459 A1 * | 1/2002 | Oh | 382/154 |
| 2002/0012460 A1 * | 1/2002 | Kochi et al. | 382/154 |
| 2004/0062434 A1 * | 4/2004 | Tsuyuki et al. | 382/154 |

* cited by examiner

*Primary Examiner* — Brian Q Le
*Assistant Examiner* — Edward Park
(74) *Attorney, Agent, or Firm* — Fish & Richardson P.C.

(57) ABSTRACT

Systems and methods using an unstructured pattern for three-dimensional model construction, such as may be used for processing images of documents are disclosed. The method generally includes projecting an unstructured infrared pattern onto a target object, capturing a pair of stereoscopic images of the pattern projected onto the target object, such as with infrared cameras, performing signal processing on the pair of stereoscopic images to cross-correlate portions of the stereoscopic images in order to identify corresponding portions in the stereoscopic images, and constructing a three-dimensional model of the target object. The three-dimensional model can be utilized to rectify, e.g., de-warp, an image of the target object, e.g., a page or both facing pages of a bound document.

26 Claims, 3 Drawing Sheets

COMPENSATING FOR DISTORTION IN DIGITAL IMAGES

CROSS-REFERENCE TO RELATED APPLICATIONS

This application is a continuation of the U.S. application Ser. No. 11/011,727, filed on Dec. 14, 2004 now U.S. Pat. No. 7,660,458, the disclosure of which is expressly incorporated herein by reference in its entirety.

BACKGROUND OF THE INVENTION

1. Field of the Invention

The present invention relates generally to processing images of documents. More specifically, systems and methods using an unstructured pattern for three-dimensional model construction, such as may be used for processing images of documents are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the libraries, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time consuming, as the bound documents typically must be lifted and repositioned after each page is scanned. Further, image quality is often poor due to loss of focus, uneven illumination, and/or distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses.

Optics and software have been developed for compensating for the image distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner. Such platen-less scanning systems also often employ light sources to better illuminate the pages being imaged.

However, traditional three-dimensional model construction typically requires the detection of features in the three-dimensional object being viewed. Such features may include the edges of the curved pages and/or the gutter between two facing pages, for example. These features can often be difficult to detect and/or discriminate from other features. Thus, it would be desirable to provide systems and methods for improved three dimensional model construction.

SUMMARY OF THE INVENTION

Systems and methods using an unstructured pattern for three-dimensional model construction, such as may be used for processing images of documents are disclosed. It should be appreciated that the present invention can be implemented in numerous ways, including as a process, an apparatus, a system, a device, a method, or a computer readable medium such as a computer readable storage medium or a computer network. Several inventive embodiments of the present invention are described below.

The method may generally include projecting an unstructured pattern onto a target object, capturing a pair of stereoscopic images of the unstructured pattern projected onto the target object performing signal processing on the pair of stereoscopic images to cross-correlate portions of the pair of stereoscopic images in order to identify corresponding portions in the pair of stereoscopic images, and constructing a three-dimensional model of the target object. The pattern may be projected using infrared or visible light. The three-dimensional model can be utilized to rectify, e.g., de-warp, an image of the target object, e.g., a page or both facing pages of a bound document. A first of the two stereoscopic images may be divided into generally non-overlapping regions where multiple regions form a line and each region is wider than it is high such that the signal processing is performed for each region of the first stereoscopic image.

The pattern may include at least one feature in each region, the feature being locally unique along at least a portion of the line on which the region is located. As an example, the pattern may include at least one feature in each region, at least a portion of the feature extending along the height of the region.

The signal processing may further include comparing each region in the first stereoscopic image to areas at a plurality of positions along a corresponding line in a second of the two stereoscopic images, each area being of generally a same size as each region, each comparison generates a similarity score between the region in the first stereoscopic image and the area in the second stereoscopic image, and designating the area in the second stereoscopic image with the highest similarity score as the area that matches the region in the first stereoscopic image, and constructing the three-dimensional model of a target object based on the image data of the pairs of matching region and area. The comparing can be limited to be performed on areas in the second stereoscopic image that are within a predetermined distance from an area corresponding to the region being compared in the first stereoscopic image.

A system for constructing a three-dimensional model of an object may generally include a projector such as an infrared projector configured to project a pattern onto a target object, a pair of stereoscopic cameras configured to capture stereoscopic images of the pattern projected onto the target object, and a signal processor configured to perform signal processing on the pair of stereoscopic images to cross-correlate portions of the pair of stereoscopic images in order to identify corresponding portions in the pair of stereoscopic images and to construct the three-dimensional model of the target object.

The system may also include a camera to capture images of the target object such that the signal processor may utilize the three-dimensional model of the target object to rectify, e.g., de-warp, the image of the target object.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods using an unstructured pattern for three-dimensional model construction, such as may be used for processing images of documents are disclosed. The systems and methods as described in the examples presented herein are well suited for imaging bound documents in which the pages are generally curved when laid open in the absence of flattening pressure. However, the systems and methods can similarly be adapted or utilized for unbound documents including large, fragile, and/or rare unbound documents as well as for various other purposes in which construction of a three-dimensional model is desired. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
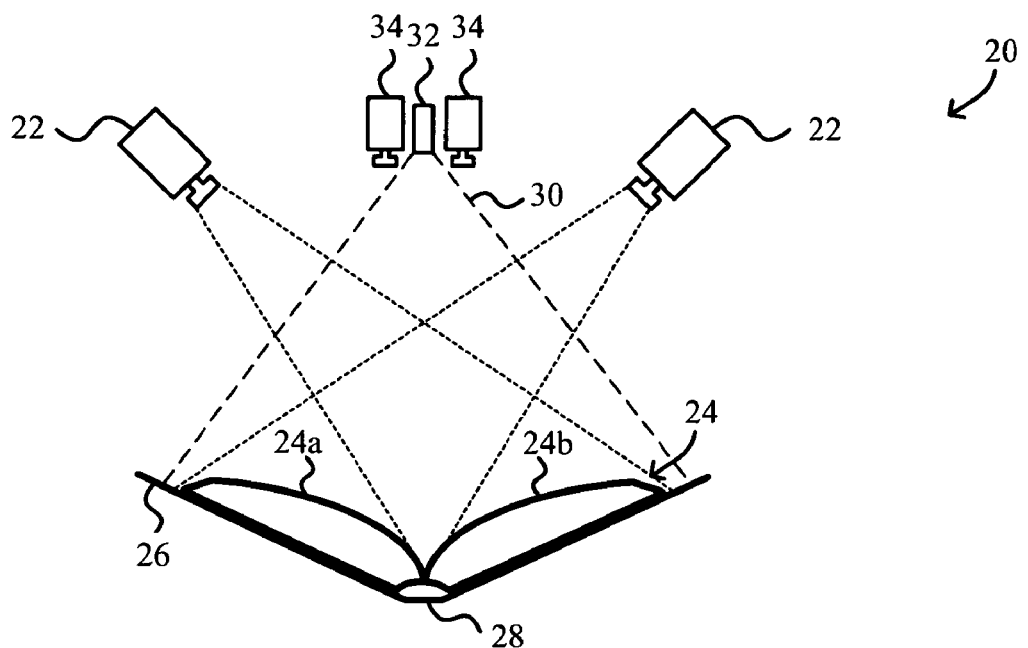
FIG. 1 is a schematic diagram of an exemplary embodiment of an image capturing system utilizing an infrared pattern for three-dimensional model construction.
Figure 2:
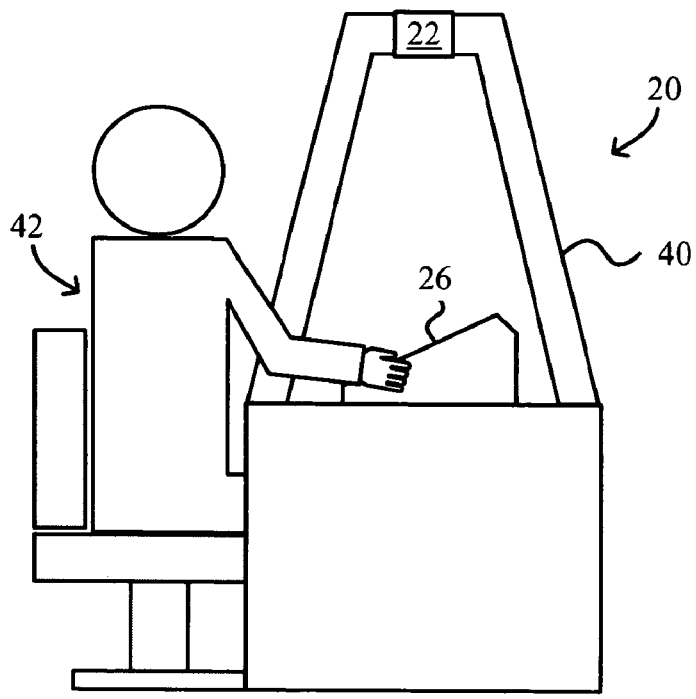
FIG. 2 is a side view illustrating an operator at the image capturing system of FIG. 1.

FIG. 1 is a schematic diagram of an exemplary embodiment of an image capturing system 20 utilizing an infrared pattern for three-dimensional model construction. FIG. 2 is a side view illustrating an operator 42 at the image capturing system 20 of FIG. 1. The image capturing system 20 generally includes one or more cameras 22, such as two high resolution cameras each for imaging or photographing a corresponding facing page 24a, 24b of an open bound document, such as a book 24, resting in a support, such as an angled cradle 26, a table top, or a mechanical device specially adapted for holding books and other documents. The cradle 26 may provide a generally flat gutter 28 such that the spacing between the left and right sides of the cradle 26 may be adjustable. The cradle spacing can be adjusted so as to maintain the distances of the pages to the camera relatively the same for books of different thicknesses in order to maintain camera focus. It is to be understood that although a book is used herein in describing the imaging system and process, the system and process may be utilized to and/or adapted for use in the imaging of any other suitable type of bound documents such as periodicals, manuscripts, pamphlets, brochures, newspapers, manuals and/or any other types of documents having a bound edge, typically with a hard or soft cover. The system and process may also be utilized and/or adapted for use in the imaging of unbound documents or various other applications in which construction of a three-dimensional model is desired. Furthermore, although the cameras 22 are shown as an exemplary image capturing mechanism for the image capturing system 20, any other image capturing mechanism such as a camera in combination with moving mirrors may be employed. The system 20 may include a housing 40 or other structure to house or otherwise support the cameras 22, lighting mechanism, and/or other components of the image capturing system 20. The cameras 22 facilitate in converting the facing pages 24a, 24b into electronic form for processing using, e.g., optical character recognition (OCR) techniques to produce an editable and/or searchable version of the document's text. The two sides of the cradle 26 corresponding to each facing page 24a, 24b, respectively, may form a cradle angle of approximately 130° for better ergonomics and book curvature.

Typically, the facing pages 24a, 24b of the open, edge-bound book 24 are inherently curved or otherwise warped, particularly in the absence of flattening pressure that can potentially damage the book 24 and/or slow the rate of the image capturing process. The curved surfaces of the facing pages 24a, 24b cause distortion in the captured images which is generally most noticeable in the vicinity of the binding. Without compensating for the image distortion, the image quality and/or OCR accuracy can decrease.

One method for compensating for the image distortion is to perform image processing on the captured images using a three-dimensional model of the curved pages. In particular, a pair of stereoscopic cameras 34 can be employed to capture three-dimensional shape information of the curved pages with which to build the three-dimensional model of the curved pages. The three-dimensional model can then be used to approximately rectify or de-warp the images captured by the cameras 22. The stereoscopic cameras 34 may employ, for example, a band pass filter on conventional cameras that also work in the visible light to image infrared (IR) images projected onto the facing pages 24a, 24b by one or more infrared projectors 32. One example of a band pass filter may be a narrow infrared band pass filter with a band centered around a wavelength of approximately 830 nm.

The three-dimensional shape (or quasi-three-dimensional) spatial data or shape information captured by the stereoscopic cameras 34 is subjected to signal processing to construct three-dimensional models of the curved pages 24a, 24b. As noted above, the three-dimensional models of the curved pages 24a, 24b are then used to un-distort or de-warp the images of the pages 24a, 24b captured by the cameras 22.

A higher quality three-dimensional model increases the quality of the resulting processed images of the pages 24a, 24b and the accuracy of any OCR performed on the processed images. To improve the quality of the three-dimensional model, an unstructured infrared pattern 38 such as one shown in FIG. 3 may be projected by the infrared projector 32 onto the facing pages 24a, 24b. Although not shown, two the infrared projectors 32 may alternatively be provided to project separate infrared patterns 38 onto each facing page 24a, 24b.

An unstructured pattern generally refers to the pattern being unspecified to the signal processor, i.e., dimensions and relative positions of the features of the pattern being unspecified. Thus the use of an unstructured infrared pattern allows changes to the infrared pattern used for three-dimensional model reconstruction without changes to the signal processing software. The infrared pattern can be feature-rich where features generally refer to corners, shapes, lines, etc. in various sizes and positions, for example. The characteristics of the features, e.g., line thickness, can be adjusted to the characteristics of the stereoscopic cameras and the particular configuration being utilized, e.g., depth of field, camera resolution, distance between the target object and the cameras, etc. The characteristics of the features can also be adjusted to the characteristics of the signal processing software such as its cross-correlation/disparity-matching window. The pattern can have a high entropy, i.e., highly random and unstructured position of the features and/or have random features. The unstructured feature-rich infrared pattern 38 thus provides a higher quality feature detection by the signal processing and hence higher quality three-dimensional model construction.

Figure 3:
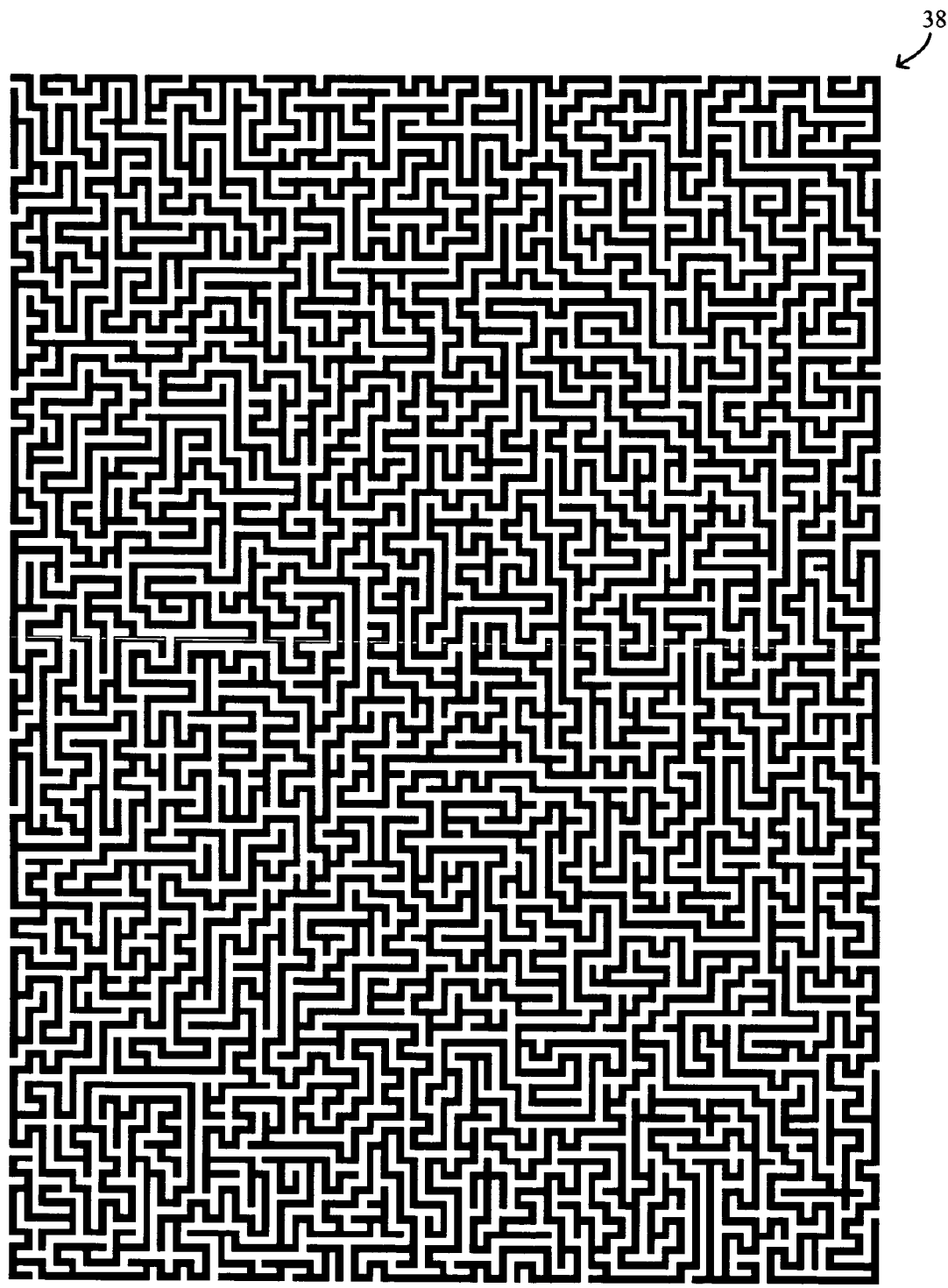
FIG. 3 is one example of a suitable unstructured infrared pattern for three-dimensional model construction.

The infrared pattern 38 can also be a pattern rich in locally unique features, i.e., features without local similarities, and optionally with sharp corners, such as the pattern resembling a labyrinth or a maze as shown in FIG. 3. With the use of the feature-rich infrared pattern 38, the number of points that the signal processor can match in the two stereoscopic images increases, by approximately a factor of ten in one example, resulting in an increase in the quality of the three-dimensional model.

Figure 4:
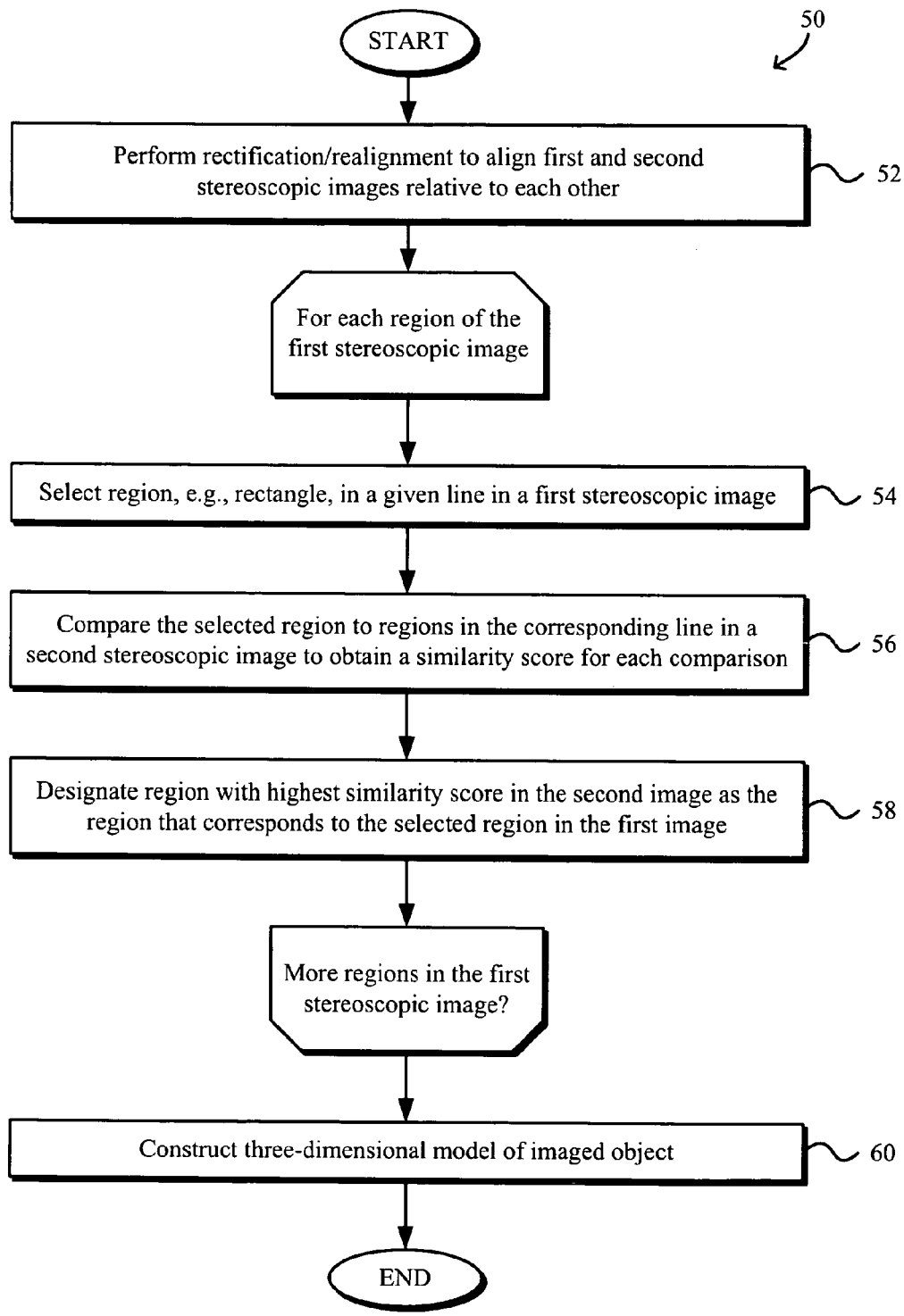
FIG. 4 is a flowchart of an exemplary process for constructing a three-dimensional model of the warped pages utilizing an unstructured infrared pattern.

FIG. 4 is a flowchart of an exemplary signal processing process 50 for constructing a three-dimensional model of the target object being imaged, e.g., the warped pages, utilizing the structured infrared pattern projected onto the object. The process 50 performs signal processing on a line by line basis on the two stereoscopic images of the pattern as captured by the pair of stereoscopic cameras. In particular, a first stereoscopic image may be divided into generally non-overlapping regions with multiple regions forming each line. In other words, the height of each line is generally the same as that of the regions. Each line extends horizontally or in an x-direction, such as across the width of the object or, alternatively, down the length of object, e.g., the facing pages of a book or other document. For each region of the first stereoscopic image, a corresponding matching region is identified in the second stereoscopic image.

In particular, at block 52, rectification is performed to align the first and second stereoscopic images relative to each other so that each line in the second image corresponds to a line in the first image. Various suitable rectification algorithms, as are well known in the art, may be employed in at block 52.

At block 54, a region in a given line is selected in the first stereoscopic image. The region is typically a rectangle that has a height equal to the height of each line and a width greater than the height. The region may be selected based on a predetermined starting point, for example, such as a top left corner.

At block 56, the selected region in the first image is compared to regions in the corresponding line in the second stereoscopic image captured by the second stereoscopic camera. In particular, the selected region can be compared to regions at various positions along the corresponding line in the second image. The regions in the second image to be compared are generally overlapping and may be limited to those within a predetermined distance from the area corresponding to the selected region in the second image. Merely as an example, the predetermined distance may be the width of a region. The comparison is made by performing cross correlations on the selected region in the first stereoscopic image and each region being compared in the second stereoscopic image. Each comparison generates a similarity score. At block 58, the region in the second image corresponding to the highest similarity score as determined in block 56 is determined to be the region in the second stereoscopic image that corresponds to the selected region in the first stereoscopic image. Note that by performing such cross-correlation, the process 50 does not require knowledge of the pattern that is projected onto the target object.

At block 60, a three-dimensional model of target object is constructed using the image data in the first and second stereoscopic images and the matching or corresponding regions in the stereoscopic images as identified in block 58. In one embodiment, blocks 54-58 are repeated for all regions in the first stereoscopic image prior to constructing the three-dimensional model at block 60. In an alternative embodiment, a portion of the three-dimensional model of target object may be constructed after each iteration of blocks 54-60.

The size of the region may be based on the level of granularity of the three-dimensional model desired. In addition, the various lines or features in the infrared pattern projected onto the target object may be sized or otherwise tuned to the size of the region used in the signal processing process 50. The infrared pattern may include a maximum number of features in each region so as to achieve a better three-dimensional model. However, the vertical lines or features of the infrared pattern may have a minimum thickness depending on the infrared cameras and the distance of the cameras to the target object. In particular, the vertical lines should have sufficient thickness to ensure that each vertical line can be captured by the cameras and thus recognizable by the signal processing process. Further, the spacing between adjacent vertical lines should be as narrow as possible so as to increase the number of features in a given region. Because each region as defined by the signal processing is generally much wider than it is tall, the horizontal dimensions are not as significant. Nonetheless, the thickness of each horizontal feature may be less than the height of each region so that the horizontal feature can be identified in signal processing. As noted above, the infrared pattern may be rich in locally unique features, i.e., features without local similarities, each feature having sharp corners. For example, each feature in the infrared pattern may be locally unique in that the feature is not repeated within an area that the signal processing process performs the comparison in block 56.

As is evident, an infrared pattern projected onto a target object, such as facing pages of an open book or other document, is utilized to construct a three-dimensional model of the target object. Using a pair of stereoscopic images captured by stereoscopic cameras and by performing cross-correlation, the signal processing process can rely only on the captured infrared stereoscopic images without attempting to identify patterns or other features in the target object itself, e.g., page edge, etc. Such use of a projected infrared image allows for control of the feature size, shape and pattern and thus helps to maximize the number of features recognized in the signal processing yet allowing for fast construction of the three-dimensional model. The resulting improved three-dimensional model in turn helps in rectifying or de-warping images of the objects.

The three-dimensional model may be constructed for each and every page of the document being imaged. The three-dimensional model can help to greatly increase the precision of de-warping techniques by projecting an unstructured pattern in infrared light.

It is noted that the pattern may also be projected onto the target object in visible light to construct the three-dimensional model of the target object, i.e., physical shape of the target object. However, projecting the pattern in infrared light prevents interference with and thus allows the simultaneous image capturing of the texture of the target object by other cameras capturing in visible light. In particular, the texture of the target object is generally defined herein as the image on the surface of the target object. In the case of a page in a document, the three-dimensional model of the page refers to the shape of the page, e.g., rectangular curved shape, and the texture on the surface of the page refers to the text and/or images on the page. Merely as example, a three-dimensional model of a person constructed using a pattern projected in visible light would include information on the shape of the person, e.g., height, shape characteristics of the face, arms, etc. but would not include eye color, skin color, pattern and/or color of the clothing, etc.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method of compensating for distortion in a digital image, comprising:
   projecting an unstructured pattern onto a document using a projector;
   capturing a pair of stereoscopic images of the unstructured pattern projected onto the document using one or more stereoscopic cameras;
   generating a plurality of lines in each of the stereoscopic images, each line comprising a plurality of non-overlapping regions of the stereoscopic images, the plurality of non-overlapping regions having a first height equal to a second height of each line, and rectifying the pair of stereoscopic images relative to each other such that each line in a first stereoscopic image of the pair of stereoscopic images corresponds to a line in a second stereoscopic image of the pair of stereoscopic images;
   cross-correlating portions of the pair of stereoscopic images to identify corresponding portions in the pair of stereoscopic images, the cross-correlating being achieved based on image data from the stereoscopic images without specification of the unstructured pattern;
   capturing a digital image of the document using an imaging camera;
   constructing a three-dimensional model of a surface of the document; and
   compensating for distortion in the digital image by rectifying the digital image based on spatial data provided by the three-dimensional model.

2. The method of claim 1, wherein cross-correlating portions of the pair of stereoscopic images comprises:
   comparing a selected region of a line in the first stereoscopic image to regions of a corresponding line in the second image;
   generating a plurality of similarity scores based on the comparing; and
   identifying a match between the selected region and a region of the corresponding line in the second image based on a highest similarity score of the plurality of similarity scores.

3. The method of claim 2, wherein the comparing, generating and identifying are performed for all regions of the lines in the first stereoscopic image, and the three-dimensional model is generated based thereon.

4. The method of claim 1, wherein the digital image includes a pair of digital images each conveying content of the document, the document including a multi-page document, and compensating for distortion in the digital image is achieved by transforming the pair of digital images based on the three-dimensional model.

5. The method of claim 1, wherein the cross-correlating comprises dividing a first image of the pair of stereoscopic images into regions, and cross-correlating each region of the first stereoscopic image with a region of a second image of the pair of stereoscopic images.

6. The method of claim 1, wherein the projector is an infrared projector that projects the unstructured pattern in infrared light onto the document.

7. The method of claim 1, wherein the unstructured pattern is feature-rich and includes at least one feature in each region of a plurality of regions of the stereoscopic images, the feature being locally unique along at least a portion of the line on which the region is located.

8. The method of claim 1, wherein without specification of the unstructured pattern indicates that dimensions and relative positions of features the unstructured pattern are unspecified.

9. The method of claim 1, wherein the cross-correlating further includes:
   selecting a region of the plurality of non-overlapping regions in a particular line of the plurality of lines of the first stereoscopic image; and
   comparing the selected region of the particular line to regions of a corresponding line of the second stereoscopic image, the regions of the corresponding line within a predetermined distance from an area corresponding to the selected region.

10. The method of claim 9, wherein the predetermined distance is a width of the selected region.

11. A non-transitory computer-readable storage medium embedded with a computer program product, the computer program product including instructions that, when executed by a processor, cause the processor to perform actions comprising:
    projecting an unstructured pattern onto a document using a projector;
    capturing a pair of stereoscopic images of the unstructured pattern projected onto the document using one or more stereoscopic cameras;
    generating a plurality of lines in each of the stereoscopic images, each line comprising a plurality of non-overlapping regions of the stereoscopic images, the plurality of non-overlapping regions having a first height equal to a second height of each line and rectifying the pair of stereoscopic images relative to each other such that each line in a first stereoscopic image of the pair of stereoscopic images corresponds to a line in a second stereoscopic image of the pair of stereoscopic images;

cross-correlating portions of the pair of stereoscopic images to identify corresponding portions in the pair of stereoscopic images, the cross-correlating being achieved based on image data from the stereoscopic images without specification of the unstructured pattern;

capturing a digital image of the document using an imaging camera;

constructing a three-dimensional model of a surface of the document; and compensating for distortion in the digital image by rectifying the digital image based on spatial data provided by the three-dimensional model.

12. The computer-readable storage medium of claim 11, wherein cross-correlating portions of the pair of stereoscopic images comprises:

comparing a selected region of a line in the first stereoscopic image to regions of a corresponding line in the second image;

generating a plurality of similarity scores based on the comparing; and identifying a match between the selected region and a region of the corresponding line in the second image based on a highest similarity score of the plurality of similarity scores.

13. The computer-readable storage medium of claim 12, wherein the comparing, generating and identifying are performed for all regions of the lines in the first stereoscopic image, and the three-dimensional model is generated based thereon.

14. The computer-readable storage medium of claim 11, wherein the digital image includes a pair of digital images each conveying content of the document, the document including a multi-page document, and compensating for distortion in the digital image is achieved by transforming the pair of digital images based on the three-dimensional model.

15. The computer-readable storage medium of claim 11, wherein the cross-correlating comprises dividing a first image of the pair of stereoscopic images into regions, and cross-correlating each region of the first stereoscopic image with a region of a second image of the pair of stereoscopic images.

16. The computer-readable storage medium of claim 11, wherein the projector is an infrared projector that projects the unstructured pattern in infrared light onto the document.

17. The computer-readable storage medium of claim 11, wherein the unstructured pattern is feature-rich and includes at least one feature in each region of a plurality of regions of the stereoscopic images, the feature being locally unique along at least a portion of the line on which the region is located.

18. The computer-readable storage medium of claim 11, wherein without specification of the unstructured pattern indicates that dimensions and relative positions of features the unstructured pattern are unspecified.

19. A system, comprising:

a projector configured to project an unstructured pattern onto a document;

one or more stereoscopic cameras configured to capture a pair of stereoscopic images of the unstructured pattern projected onto the document;

one or more processors that generate a plurality of lines in each of the stereoscopic images, each line comprising a plurality of non-overlapping regions of the stereoscopic images, the plurality of non-overlapping regions having a first height equal to a second height of each line and rectify the pair of stereoscopic images relative to each other such that each line in a first stereoscopic image of the pair of stereoscopic images corresponds to a line in a second stereoscopic image of the pair of stereoscopic images, and that cross-correlate portions of the pair of stereoscopic images to identify corresponding portions in the pair of stereoscopic images, the cross-correlating being achieved based on image data from the stereoscopic images without specification of the unstructured pattern; and an imaging camera that captures a digital image of the document, wherein the one or more processors construct a three-dimensional model of a surface of the document, and compensate for distortion in the digital image by rectifying the digital image based on spatial data provided by the three-dimensional model.

20. The system of claim 19, wherein the one or more processors cross-correlate portions of the pair of stereoscopic images by:

comparing a selected region of a line in the first stereoscopic image to regions of a corresponding line in the second image;

generating a plurality of similarity scores based on the comparing; and identifying a match between the selected region and a region of the corresponding line in the second image based on a highest similarity score of the plurality of similarity scores.

21. The system of claim 20, wherein the comparing, generating and identifying are performed for all regions of the lines in the first stereoscopic image, and the three-dimensional model is generated based thereon.

22. The system of claim 19, wherein the digital image includes a pair of digital images each conveying content of the document, the document including a multi-page document, and compensating for distortion in the digital image is achieved by transforming the pair of digital images based on the three-dimensional model.

23. The system of claim 19, wherein the one or more processors cross-correlate by dividing a first image of the pair of stereoscopic images into regions, and cross-correlating each region of the first stereoscopic image with a region of a second image of the pair of stereoscopic images.

24. The system of claim 19, wherein the projector is an infrared projector that projects the unstructured pattern in infrared light onto the document.

25. The system of claim 19, wherein the unstructured pattern is feature-rich and includes at least one feature in each region of a plurality of regions of the stereoscopic images, the feature being locally unique along at least a portion of the line on which the region is located.

26. The system of claim 19, wherein without specification of the unstructured pattern indicates that dimensions and relative positions of features the unstructured pattern are unspecified.

* * * * *